(12) United States Patent
Chang Lee (10) Patent No.: US 11,495,049 B2
(45) Date of Patent: Nov. 8, 2022

(54) BIOMETRIC FEATURE RECONSTRUCTION METHOD, STORAGE MEDIUM AND NEURAL NETWORK

(71) Applicant: SHANGHAI HARVEST INTELLIGENCE TECHNOLOGY CO., LTD, Shanghai (CN)

(72) Inventor: Ya-Ti Chang Lee, Shanghai (CN)

(*) Notice: Subject to any disclaimer, the term of this patent is extended or adjusted under 35 U.S.C. 154(b) by 150 days.

(21) Appl. No.: 16/699,738

(22) Filed: Dec. 2, 2019

(65) Prior Publication Data

US 2020/0184190 A1 Jun. 11, 2020

(30) Foreign Application Priority Data

Nov. 30, 2018 (CN) .......................... 201811455697.6
Nov. 30, 2018 (CN) .......................... 201811457996.3

(51) Int. Cl.
| | |
|---|---|
| *G06V 40/12* | (2022.01) |
| *G06N 3/08* | (2006.01) |
| *G06T 5/00* | (2006.01) |
| *G06K 9/62* | (2022.01) |
| *G06V 10/82* | (2022.01) |
| *G06V 40/18* | (2022.01) |
| *G06N 3/04* | (2006.01) |

(52) U.S. Cl.
CPC .......... *G06V 40/1347* (2022.01); *G06N 3/08* (2013.01); *G06T 5/001* (2013.01); *G06T 2207/20081* (2013.01); *G06T 2207/20084* (2013.01)

(58) Field of Classification Search
CPC .......... G06K 9/00067; G06K 9/00617; G06K 9/001; G06K 9/6271; G06N 3/08; G06N 3/088; G06N 3/0454; G06T 5/001; G06T 2207/20084; G06T 2207/20081
See application file for complete search history.

(56) References Cited

U.S. PATENT DOCUMENTS

2017/0140247 A1* 5/2017 Yoo ...................... G06K 9/6256
2018/0150679 A1* 5/2018 Kim ...................... G06V 40/70

* cited by examiner

*Primary Examiner* — John W Lee (57) ABSTRACT

A method, storage media and neural network for rebuilding biometric feature is provided. The method includes inputting the partial texture image obtained to the neural network and outputting a predictive value of an entire texture image that is output by the neural network. The above technical solution is via the neural network used to process images and the neural network includes the feature value layer. A plurality of the partial texture images is converted to the feature values at the technical level, and the composite calculation of a plurality of partial texture images is avoided on the application level. Because the entire texture image is not synthesized in the end, data leakage and theft are avoided. Thus, the security of the method for analyzing texture image is improved.

16 Claims, 5 Drawing Sheets

BIOMETRIC FEATURE RECONSTRUCTION METHOD, STORAGE MEDIUM AND NEURAL NETWORK

FIELD OF THE DISCLOSURE

The present disclosure relates to a technical field of biometric feature identifying, more particularly to a method, storage media and neural network for rebuilding biometric feature.

BACKGROUND OF THE INVENTION

With the development of technology and technological progress, touch display panels have been widely used in devices for human-computer interaction, such as operation screen of industrial computers, touch screen of tablets and smart phones. Because the devices are accompanied by a lot of user information in the process of using them, the security protection of the user information is particularly important. Among the many methods for the security protection of the user information, the encryption of identifying fingerprints is an important item.

In the current fingerprint acquisition methods, a common technical means is to use a lens-type architecture to obtain an entire fingerprint image of the fingerprint for storing the image information corresponding to the fingerprint. When the fingerprint is used for comparison, a fingerprint image for subsequent logins is compared with the entire fingerprint image of the original record to achieve the efficacy of identifying fingerprints.

In the existing technology, in fingerprint sensors designed by us, partial imaging results of the fingerprint can be obtained by a multi-unit structure of the touch screen at the same time. Each partial imaging result is a preliminary imaging result used to reflect a partial fingerprint information of the fingerprint. In the operation of analyzing the imaging result, one method is to restore the entire fingerprint image by a complex algorithm for denoising, supplementation, interpolation and stitching. At present, an application of the neural network in the field of processing images has excellent performance. If the neural network can be trained to process a plurality of fingerprint images or single fingerprint image, one partial fingerprint image does not need to have processes of denoising, supplementation, interpolation and stitching and is directly synthesized to get the final entire fingerprint image. The information of the partial fingerprint images is processed to synthesize the entire fingerprint image by the neural network technology can further improve the recognition efficiency of identifying fingerprints. Therefore, it is necessary to provide a new technical solution to solve the above problem of reducing execution performance when the multi-threaded is working (For example, a plurality of the partial fingerprint images is processed at the same time.).

In summary, it is very important to provide a method that can improve the efficiency of recognition and analysis in the situation of the partial fingerprint images inputted and improve the user experience of the fingerprint recognition device of the touch screen.

SUMMARY OF THE INVENTION

Therefore, a technical solution for rebuilding fingerprint is provided to solve the problem of the lower efficiency of identifying fingerprints.

To achieve the above object, a method for rebuilding biometric feature provided includes inputting a partial texture image obtained to a neural network, obtaining a predictive value of an entire texture image that is output by the neural network wherein the partial texture image belongs to the entire texture image.

In some embodiments, the method for rebuilding biometric feature further includes building the neural network, training the neural network by training samples, and wherein the training samples inputted are some partial texture images belonging to an entire biometric texture, output of the neural network is the entire texture image to which the partial texture images belong.

In some embodiments, the neural network including a feature value layer, the method further includes the following step. After the training of the neural network is completed, the partial texture image obtained is input to the neural network, and a feature value output by the feature value layer of the neural network is obtained.

In some embodiments, the method for rebuilding biometric feature further includes storing a feature value corresponding to a biometric texture to a biometric texture database.

In some embodiments, the method for rebuilding biometric feature further includes comparing the feature value output by the neural network and the feature value stored in the biometric texture database after obtaining the partial texture image.

In some embodiments, the method for rebuilding biometric feature further includes the following step. After obtaining the partial texture image, when the difference between the feature value output by the neural network and the feature value stored in the biometric texture database is within a preset error range, the feature value output by the neural network and the feature value stored in the biometric texture database is determined to be similar.

In some embodiments, the method for rebuilding biometric feature further includes the following step. After obtaining the partial texture image, when the feature value output by the neural network and the feature value stored in the biometric texture database is determined to be similar, a certification directive is executed and passed.

In some embodiments, the method for rebuilding biometric feature further includes building the biometric texture database and storing the entire texture image to the biometric texture database.

In some embodiments, the method for rebuilding biometric feature further includes comparing the entire texture image corresponding to the predictive value output by the neural network with the entire texture image stored by the biometric texture database.

In some embodiments, the method for rebuilding biometric feature further includes storing the partial texture images input as the training samples to the biometric texture database, and the partial texture images and the entire texture image belong a texture image corresponding to a same biometric.

In some embodiments, the neural network includes a convolution layer, a connection layer and a feature value layer.

In some embodiments, a relationship of the connection weight of a neuron among the convolution layer, the connection layer and the feature value layer are formed by the following steps.

First, the neural network is built.

Next, the neural network is trained by training samples, and the training samples inputted are some partial texture images of an entire texture, and the entire texture image is output until the training of the neural network was completed.

In some embodiments, the neural network includes a convolution layer and a deconvolution layer. The convolution layer and deconvolution layer are connected in a predetermined order.

In some embodiments, the texture image is a fingerprint image, a palm print image, a footprint image, a toe print image, a retinal image or an iris image.

A storage media is provided. A computer program is stored by the storage media. When the computer program is executed, the computer program performs the following steps.

First, a partial texture image obtained is inputted to a neural network. Next, a predictive value of an entire texture image is obtained, wherein the partial texture image is output by the neural network, the partial texture image belongs to the entire texture image.

In some embodiments, when the computer program is executed, the computer program further performs the following steps.

First, the neural network is built. Next, the neural network is trained by training samples. Wherein the training samples inputted are some partial texture images of an entire texture, the entire texture image corresponding to the partial texture images are output.

In some embodiments, the neural network includes a feature value layer, and when the computer program is executed, the computer program further performs the following step.

After the training of the neural network is completed, the partial texture image obtained is input to the neural network and a feature value output by the feature value layer of the neural network is obtained.

In some embodiments, when the computer program is executed, the computer program further performs the following step of storing a feature value corresponding to a biometric texture to a biometric texture database in advance.

In some embodiments, when the computer program is executed, the computer program further performs the following step of comparing the feature value output by the neural network and the feature value stored in the biometric texture database in advance after obtaining the partial texture image.

A neural network for rebuilding biometric feature is provided. The neural network for rebuilding biometric feature includes a convolution layer, a connection layer and a feature value layer. A relationship of the connection weight of a neuron among the convolution layer, the connection layer and the feature value layer are formed by the following steps.

First, the neural network is built.

Next, the neural network is trained by training samples. Wherein the training samples inputted are some partial texture images of an entire fingerprint, the entire texture image is output until the training of the neural network was completed.

Compared to existing technology, a method, storage media and neural network for rebuilding biometric feature is provided. The method includes inputting the partial texture image obtained to the neural network and outputting a predictive value of an entire texture image that is output by the neural network. The above technical solution is via the neural network used to process images and the neural network includes the feature value layer. A plurality of the partial texture images is converted to the feature values at the technical level, and the composite calculation of a plurality of partial texture images is avoided on the application level. Because the entire texture image is not synthesized in the end, data leakage and theft are avoided. Thus, the security of the method for analyzing texture image is improved.

DESCRIPTION OF THE PREFERRED EMBODIMENTS

In order to explain the technical content, structural features, achieved objectives, and effects of the technical solution in detail, specific embodiments are described below in conjunction with drawings.

Figure 1:
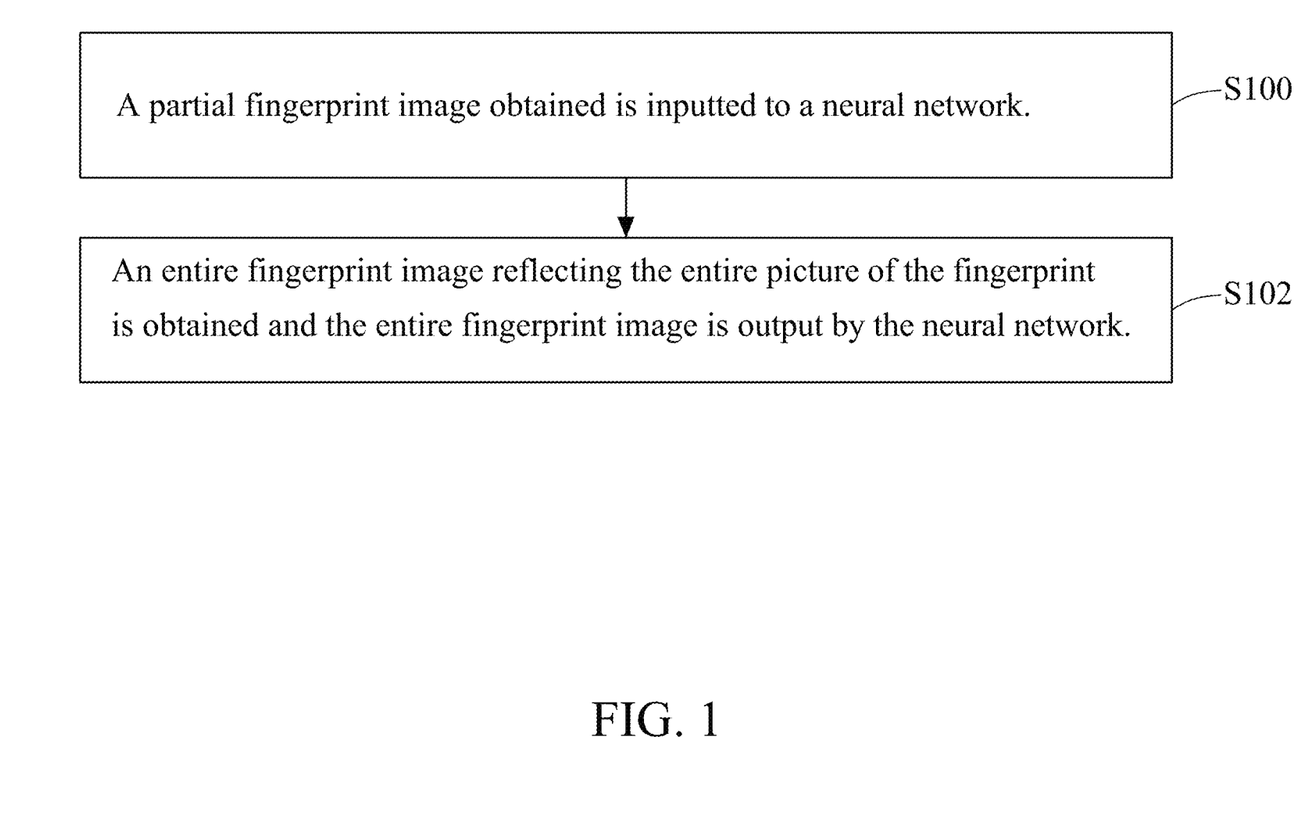
FIG. 1 illustrates a flowchart of a method for rebuilding fingerprints with an embodiment of the present disclosure.

Please refer to FIG. 1. A method for rebuilding fingerprints is provided. The method includes the following steps.

First, a partial fingerprint image obtained is inputted to a neural network in step S100.

Next, in step S102, an entire fingerprint image reflecting the entire picture of the fingerprint is obtained and the entire fingerprint image is output by the neural network.

The entire fingerprint image that reflects the entire picture of the fingerprint is considered to fit the identification requirements under the general comparison method. It is difficult to have a quantitative indicator. Here, the basic requirements are presented below.

1. To reflect the entire picture of the fingerprint, it is necessary to be able to distinguish the specific type of the fingerprint, such as bow, arch, left protrusion, right protrusion, spiral. Specifically, the central body of the fingerprint is clear.

2. If an output image can be regarded as the entire fingerprint image, the output image must include at least the area corresponding to the input partial fingerprint image. Specifically, the neural network needs to learn is to predict and filling, and the resolution of the output image is not less than the input partial fingerprint image.

In the embodiment, the neural network configured to process one or a plurality of the partial fingerprint images is obtained via the characteristic of the neural network or the entire picture of the fingerprint is predicted by the neural network. The number of the partial fingerprint image can be one or multiple. Preferably, the number of the partial fingerprint image can be more than three. Of course, the partial fingerprint images belong a part of the texture of an entire fingerprint.

A specific embodiment may be storing the entire fingerprint image and some partial fingerprint images corresponding to the entire fingerprint image in a fingerprint database in advance. Therefore, in the method, the following steps can be performed in advance. First, a fingerprint database is built. Next, the fingerprint database includes data of some partial fingerprint images of the same fingerprint and the entire fingerprint image of the corresponding fingerprint. When the number of the entire fingerprint image storied is enough, the following steps can be performed. First, a neural network architecture is built for processing images. The corresponding partial fingerprint images is used as an input, and the corresponding entire fingerprint image is used as an output for training. When the training result is stable, the neural network architecture will become a neural network configured to process the partial fingerprint image for calculating the entire fingerprint image. The calculation steps can be simplified by the neural network analyzing the partial fingerprint image. Denoising, supplementation, interpolation and stitching are all transformed into their own neuron parameters. Furthermore, the learning characteristics of the neural network can be used to obtain a predictive value of the entire fingerprint image of the corresponding entire fingerprint in the neural network, even if the fingerprint lacks some information. When there are more training samples, the predictive result will be more accurate. The entire fingerprint image is reverted again by the neural network, which avoids the leakage of information and improves the security of the existing fingerprint analysis technology.

In some embodiments, the present disclosure can also adjust the structure and corresponding parameters in the neural network. For example, in the embodiment, the neural network includes a convolution layer and a deconvolution layer connected in order. In the embodiment, the input of the neural network is some partial fingerprint images. A convolution result data is obtained by the convolution layers. The number of convolution layers can be set according to the needs of the operation. After the convolution result data is input to the deconvolution layer, the predictive result of the feature value of the entire fingerprint image corresponding to the partial fingerprint image is output by the final neural network. We can quickly analyze the partial fingerprint image by the design of the above neural network architecture, and different results formed by many types of the feature value has a good performance and a strong adaptability.

Figure 2:
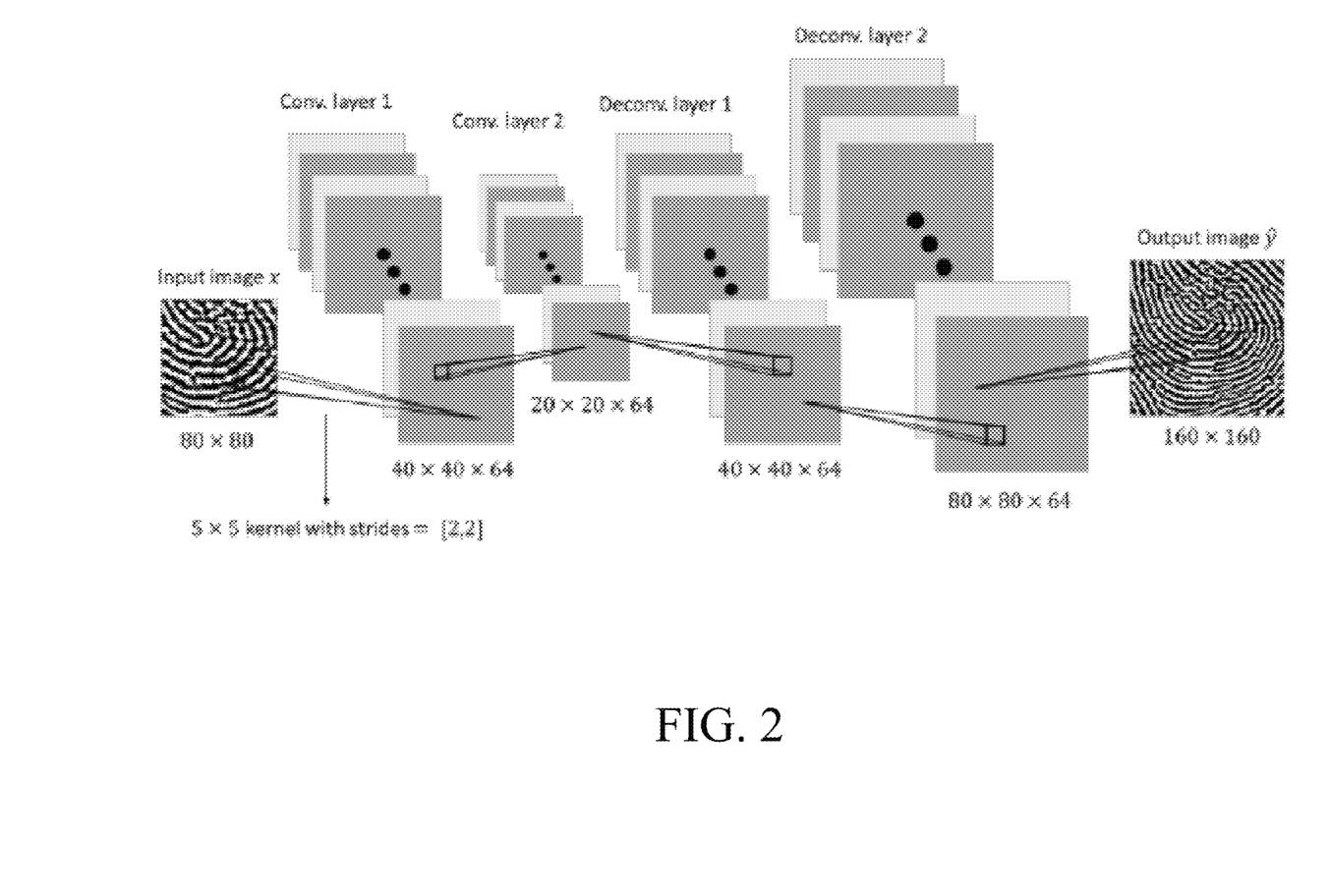
FIG. 2 illustrates a schematic diagram of a neural network structure with an embodiment of the present disclosure.

In some embodiments of the FIG. 2, the neural network of the present disclosure including a first convolution layer, a second convolution layer, a first deconvolution layer and a second deconvolution layer that are connected in order. The size of the core of the first convolution layer is 5×5. The step size of the core (the displacement of the core) is 2. The number of the feature map is 64. The disposing of the second deconvolution layer are corresponding to the disposing of the first convolution layer. The size of the core, the step size of the core and the number of the feature map of the core of the second convolution layer can be the same as the features of the first convolution layer. In addition, the core can choose different parameters according to the needs of the operation.

In the embodiment of the FIG. 2, the size of the input partial fingerprint image is 80*80 pixels. The data result of 40*40 pixels is obtained after the first convolution layer. That the data result is input to the second convolution layer can obtain a second convolution result of 20*20 pixels. The second convolution result is calculated via the second deconvolution layer. An output entire fingerprint image with a size of 160*160 pixels is obtained via adjusting the parameters. The steps for rebuilding fingerprint can be better performed by the above design. By a practical perspective, when the size of the kernel is smaller, the features extracted by the convolution algorithm is more detailed. However, overfitting is easy to occur, and it needs to be more calculated. When the size of the kernel is bigger, the features extracted is rougher in order to cause the match result to be inaccurate. The selection of the step size also includes the same situation. Readers can adjust the size and the step size of the kernel according to the needs of the operation.

In other embodiments, the neural network architecture can be further optimized. A connection layer can be disposed between the second convolution layer and the first deconvolution layer. The connection layer is configured to input the first deconvolution layer after processing the operation result of the second convolution layer. A multilayer structure can be disposed in the connection layer. The structure of each layer includes a plurality of neurons. When the connection layer has more layers, more neurons are in each layer and the processing result of the neural network is more accurate. The processing result needs to be more calculated. In some embodiments, the neural network further includes a first connection layer and a second connection layer. The number of the neuron in each layer is disposed to 400. By the connection layer including multilayer structure, the processing capacity and processing efficiency of the neural network is further improved, and the accuracy of rebuilding fingerprint is improved.

By the step of generating the entire fingerprint image from the partial fingerprint image, the present disclosure completes the reconstruction of an entire fingerprint. For better application, in other embodiments, the method further includes the step of comparing the entire fingerprint image output by the neural network and the entire fingerprint image stored by fingerprint database. The following steps is performed according to the match result. If the entire fingerprint image output by the neural network is the same as the entire fingerprint image stored by fingerprint database, the fingerprints of both parties determined is the same. A higher security operation can run according to the match result. If the entire fingerprint image output by the neural network is not the same as the entire fingerprint image stored by fingerprint database, the fingerprints of both parties determined is not the same. The entire fingerprint image output by the neural network and a partial fingerprint image corresponding to the entire fingerprint image can be as a new correspondence and the new correspondence is storied in the fingerprint database. The match result can be determined to be inconsistent. The device can be forbidden from the subsequent security operation. The fingerprint database can be disposed on cloud server and be run on the local user equipment. The above comparison steps can be run on the cloud server and directly be run on the local user equipment. By the above method, the present disclosure can determine the beneficial effect of entire fingerprint matching by obtaining the partial fingerprint image. The present disclosure reduces the need of the hardware device recognizing images and improves the universality of the method for identifying fingerprints. In addition, the accuracy of the method for identifying fingerprints is improved in the same time.

In some embodiments, a storage media for rebuilding fingerprint is provided. A computer program is stored by the storage media. When the computer program is executed, the computer program performs the following steps. First, the partial fingerprint image obtained is inputted to the neural network. Next, a predictive value of the entire fingerprint image output by the neural network is obtained.

In the further embodiment, when the computer program is executed, the computer program further performs the following steps. First, the neural network is built. Next, the neural network is trained by training samples. The training samples inputted are some partial fingerprint images of an entire fingerprint, and the entire fingerprint image corresponding to the partial fingerprint images is output.

In the further embodiment, when the computer program is executed, the computer program further performs the following step of comparing the entire fingerprint image output by the neural network and the fingerprint images of the fingerprint database.

In a specific embodiment, when the computer program is executed, the computer program further performs the following steps. First, a fingerprint database is built. Next, the fingerprint database includes the partial fingerprint images of the same fingerprint and the corresponding entire fingerprint image.

In a specific embodiment, the neural network includes a convolution layer and a deconvolution layer that are connected in order.

In some embodiments, the neural network includes two convolution layers and two deconvolution layers.

In some embodiments, the size of the core of the first convolution layer is 5×5. The step size of the core is 2. The number of the feature map is 64.

Figure 3:
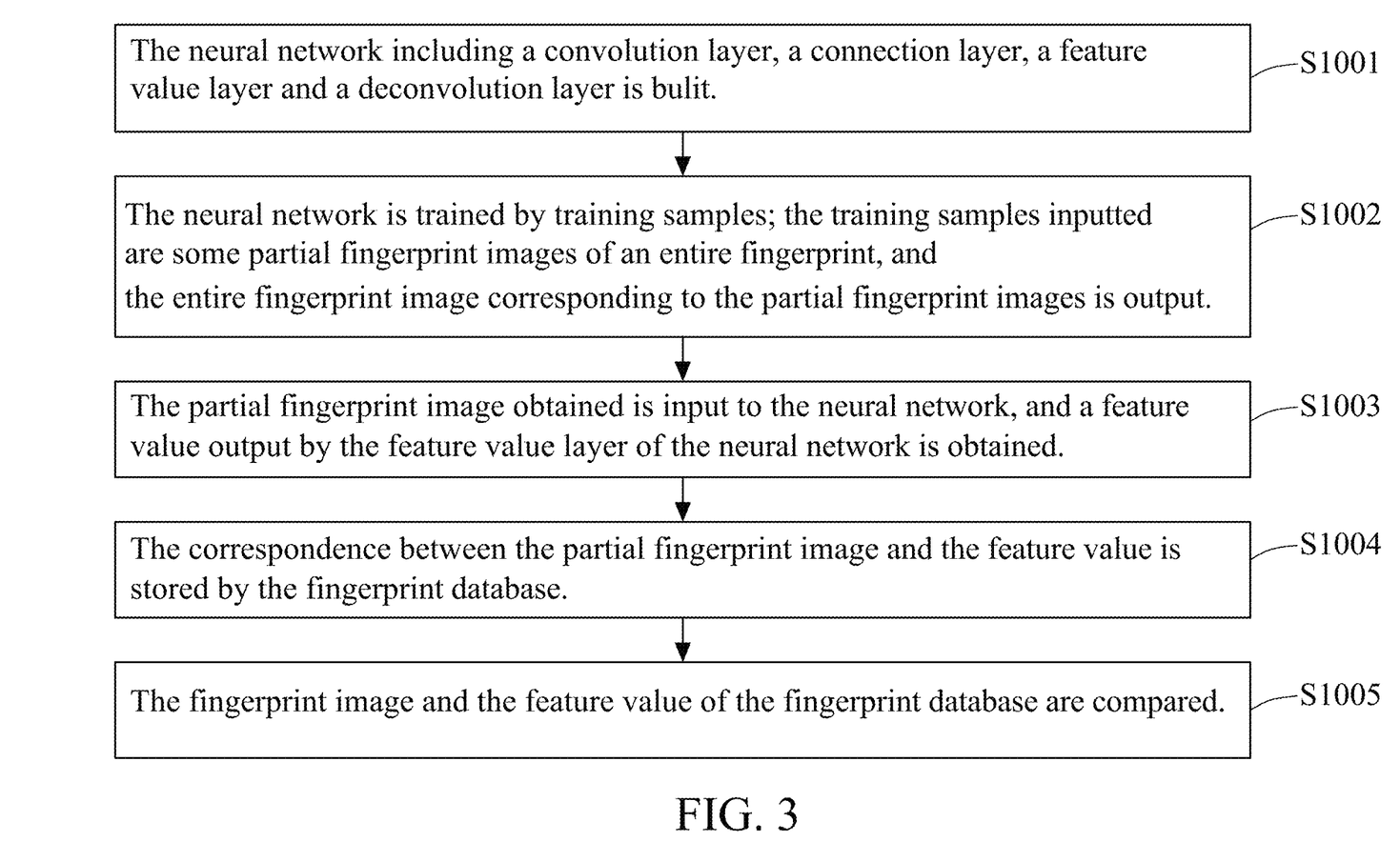
FIG. 3 illustrates a flowchart of a method for analyzing biometric feature with an embodiment of the present disclosure.

Please refer to FIG. 3. FIG. 3 illustrates a flowchart of a method for analyzing biometric. For example, the biometric is a fingerprint, a palm print, a footprint, a toe print, a retinal, an iris etc. The fingerprints are used as an example in the embodiment, but it can also replace other biometric textures, which is also specifically implemented. Please refer to FIG. 1. The method for analyzing biometric includes the following steps.

First, the neural network is built in step S1001. The neural network includes a convolution layer, a connection layer, a feature value layer and a deconvolution layer.

In step S1002, the neural network is trained by training samples. The training samples inputted are some partial fingerprint images of an entire fingerprint, and the entire fingerprint image corresponding to the partial fingerprint images is output.

After the training of the neural network is completed, the neural network with solidified neurons is obtained. In step S1003, the partial fingerprint image obtained is input to the neural network, and a feature value output by the feature value layer of the neural network is obtained.

In the embodiment, in the method for analyzing biometric, the neural network including a first convolution layer, a second convolution layer, a first connection layer, the feature value layer, a second connection layer, a first deconvolution layer and a second deconvolution layer that are connected in order. The number of the convolution layer, the feature value layer and the deconvolution layer can be set according to actual needs. In the embodiment of the FIG. 2, by training the neural network via the above method, after the training of the neural network is completed, the neurons in the feature value layer and the layers of the neural network have solidified to form a specific connection factor. The specific partial fingerprint image can correspond to the specific output entire fingerprint image. Similarly, the output of the feature value layer of the neural network can also be specified. In the embodiment, the feature value layer includes 128 neurons. That the output of the feature value layer is a 128-dimensional vector represents the corresponding output entire fingerprint image. Furthermore, it also represents some corresponding partial fingerprint images. When the number of the neurons in the feature value layer is bigger, the representation is more accurate. In practical applications, after the training of the neural network is completed, the final entire fingerprint image does not need to be output, only the feature value calculated from the feature value layer to represent the partial fingerprint image. By the neural network including the feature value layer for processing images, a plurality of partial fingerprint images is converted to a feature value at the technical level. The calculation of synthesizing multiple partial fingerprint images can be avoided at the application level. Because the entire fingerprint image is not synthesized in the end, data leakage and theft are avoided. Thus, the security of the method for analyzing biometric is improved.

To better satisfy the need of analyzing biometric, by the above analysis method, a correspondence obtained between the partial fingerprint image of the biometric and the feature value is stored in a database. It also includes the following step. In step S1004, the correspondence between the partial fingerprint image and the feature value is stored by the fingerprint database. For example, in an embodiment, partial fingerprint images a1, a2, a3, a4 input in the same batch belong to the same fingerprint A1. The partial fingerprint images a1, a2, a3, a4 is input to the trained neural network to obtain an output d1 of the feature value layer. A correspondence 【A1, d1】 between the corresponding entire fingerprint image and the feature value can be stored in the database. A correspondence 【a1, a2, a3, a4, d1】 between the partial fingerprint image and the feature value can be stored. Only valid feature value d1 can even be stored in the database. The fingerprint database is constructed by a plurality of the feature values d1, d2, d3 . . . d100 of the fingerprint.

When the comparison is needed, the steps can be performed. A first fingerprint and a second fingerprint are compared. By the above method, the output of the feature value layer is obtained by the neural network obtained by training. The fingerprint image and the feature value of the fingerprint database are compared in step S1005. When the difference between the feature value obtained via some partial fingerprint images for comparing processed by the neural network and existing feature values in the database is less than a preset threshold, the fingerprint for comparing is the same to the fingerprint in the database. The calculation method of the difference can refer to the calculation method of the vector difference. The preset threshold can be adjusted according to the actual situation and the optimal preset threshold is 1. The fingerprint database is built by the above method to store the feature value of existing fingerprints. The new fingerprint image is compared with the fingerprint image in the fingerprint database during subsequent verifying fingerprints. It can realize the comparison operation between different fingerprints and further enhance the efficiency of identifying fingerprints.

In the preferred embodiment of the FIG. 3, the size of the core of the first convolution layer is 5×5. The step size of the core is 2. The number of the feature map is 64. The number of neurons in the first layer of the connection layer is 1600. The number of neurons in the second layer of the connection layer is 6400. The feature value layer includes 128 neurons. Its coefficient is the feature value. It can be represented as a 128-dimensional vector. By calculating the distance between the feature value obtained from different input images, we can compare fingerprints. Specifically, an input image is x and the entire fingerprint image corresponding to the input image is y. The output of the neural network is $\hat{y}$. The training goal is to minimize the reconstruction error function $\pounds(y, \hat{y})$. The size, the step size and the number of the feature map of the above kernel according to the needs of the operation can be adjusted. The above-mentioned preferred settings can enable the neural network to perform calculation of the feature value layer faster and improve robustness.

In some embodiments, the biometric texture may also be a palm print. Please refer to FIG. 4. The palm print is a target. The method includes the following steps. First, the neural network is built in step S300. Next, the neural network is trained by training samples in step S302. The training samples inputted are some partial palm print images of an entire palm print, and an entire palm print image corresponding to the partial palm print images is output. After the training of the neural network is completed, the neural network with solidified neurons is obtained. The partial palm print image obtained is input to the neural network, and a feature value output by the feature value layer of the neural network is obtained in step S304. In the embodiment of the FIG. 4, by training the neural network via the above method, after the training of the neural network is completed, the neurons in the feature value layer and the layers of the neural network have solidified to form a specific connection factor. The specific partial palm print image can correspond to the specific output entire palm print image. Similarly, the output of the feature value layer of the neural network can also be specified In the embodiment, the feature value layer includes 128 neurons. That the output of the feature value layer is a 128-dimensional vector represents the corresponding output entire palm print image. Furthermore, it also represents some corresponding partial palm print images. When the number of the neuron in the feature value layer is bigger, the representation is more accurate. In practical applications, after the training of the neural network is completed, the final entire palm print image does not need to be output, only the feature value calculated from the feature value layer to represent the partial palm print image. Because the entire palm print image is not synthesized in the end, data leakage and theft are avoided. Thus, the security of the method for analyzing biometric is improved. By the neural network including the feature value layer for processing images, a plurality of partial palm print images is converted to a feature value at the technical level. The calculation of synthesizing multiple partial palm print images can be avoided at the application level. Because the entire palm print image is not synthesized in the end, data leakage and theft are avoided. Thus, the security of the method for analyzing biometric is improved.

Figure 4:
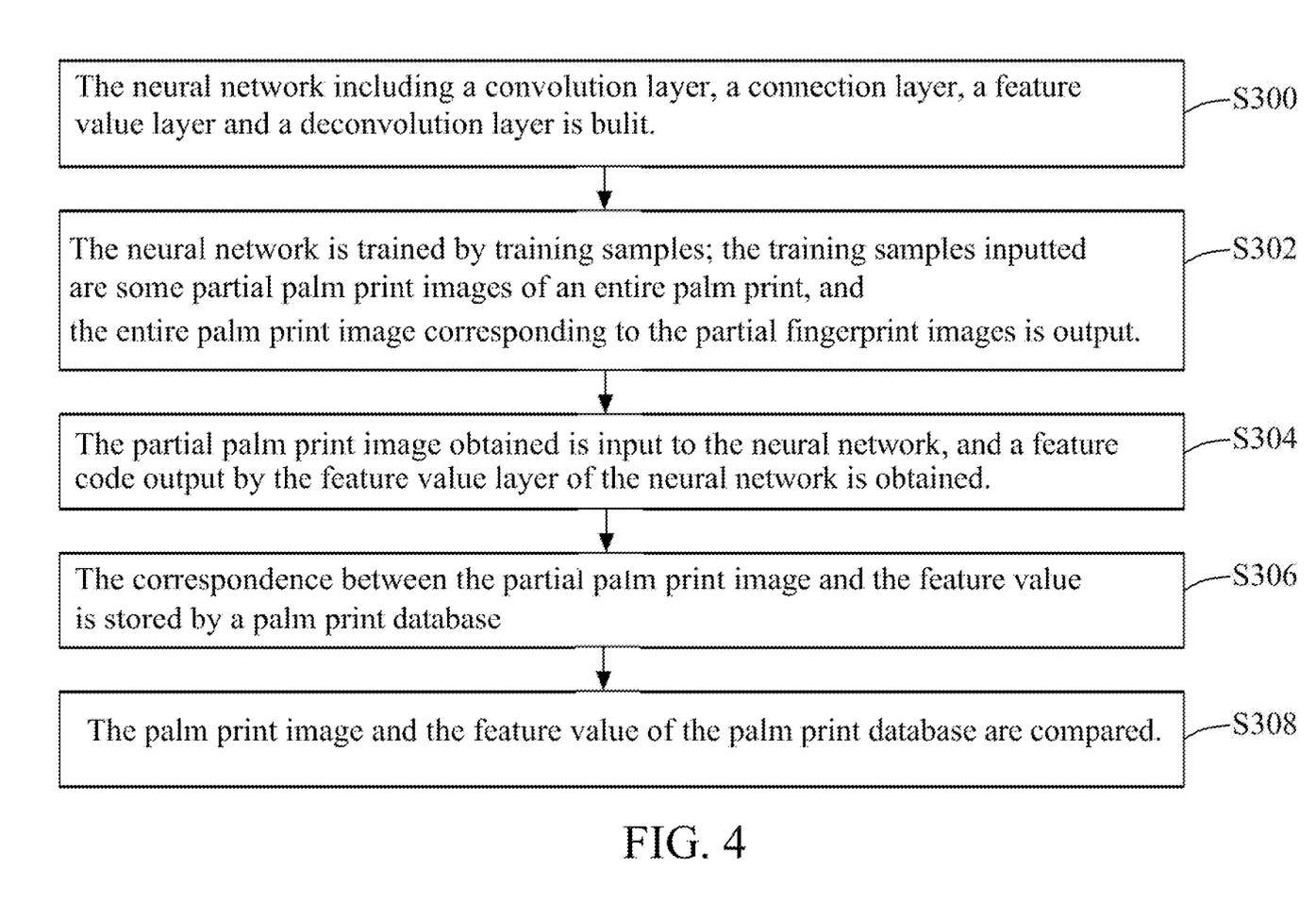
FIG. 4 illustrates a flowchart of a method for analyzing palm prints of the biometric feature with an embodiment of the present disclosure.

To better satisfy the need of analyzing biometric, by the above analysis method, a correspondence obtained between the partial palm print image of the biometric texture and the feature value is stored in a database. In step S306, the correspondence between the partial palm print image and the feature value is stored by a palm print database. For example, in an embodiment, partial palm print images c1, c2, c3, c4 input in the same batch belong to the same palm print C1. The partial palm print images a1, a2, a3, a4 is input to the trained neural network to obtain an output h1 of the feature value layer. A correspondence 【C1, h1】 between the corresponding entire palm print image and the feature value can be stored in the database. A correspondence 【c1, c2, c3, c4, h1】 between the partial palm print image and the feature value can be stored. Only valid feature value h1 can even be stored in the database. The palm print database is constructed by a plurality of the feature values h1, h2, h3 . . . h100 of the palm print. When the comparison is needed, the steps can be performed. A first palm print and a second palm print are compared. By the above method, the output of the feature value layer is obtained by the neural network obtained by training. The palm print image and the feature value of the palm print database are compared in step S308. When the difference between the feature value obtained via some partial palm print images for comparing processed by the neural network and existing feature values in the database is less than a preset threshold, the palm print for comparing is the same to the palm print in the database. The calculation method of the difference can refer to the calculation method of the vector difference. The preset threshold can be adjusted according to the actual situation and the optimal preset threshold is 1. The palm print database is built by the above method to store the feature value of existing palm prints. The new palm print image is compared with the palm print image in the palm print database during subsequent verifying palm prints. It can realize the comparison operation between different fingerprints and further enhance the efficiency of identifying palm prints.

In some embodiments, the biometric texture is an iris. Please refer to FIG. 5. The iris is a target. The method includes the following steps. First, the neural network including a convolution layer, a connection layer, a feature value layer and a deconvolution layer is built in step S400. Next, the neural network is trained by training samples in step S402. The training samples inputted are some partial iris images of an entire iris, and an entire iris image corresponding to the partial iris images is output. After the training of the neural network is completed, the neural network with solidified neurons is obtained. The partial iris image obtained is input to the neural network, and a feature value output by the feature value layer of the neural network is obtained in step S404. In the embodiment of the FIG. 5, by training the neural network via the above method, after the training of the neural network is completed, the neurons in the feature value layer and the layers of the neural network have solidified to form a specific connection factor. The specific partial iris image can correspond to the specific output entire iris image. Similarly, the output of the feature value layer of the neural network can also be specified In the embodiment, the feature value layer includes 128 neurons. That the output of the feature value layer is a 128-dimensional vector represents the corresponding output entire iris image. Furthermore, it also represents some corresponding partial iris images. When the number of the neuron in the feature value layer is bigger, the representation is more accurate. In practical applications, after the training of the neural network is completed, the final entire iris image does not need to be output, only the feature value calculated from the feature value layer to represent the partial iris image. Because the entire iris image is not synthesized in the end, data leakage and theft are avoided. Thus, the security of the method for analyzing biometric is improved. By the neural network including the feature value layer for processing images, a plurality of partial iris images is converted to a feature value at the technical level. The calculation of synthesizing multiple partial iris images can be avoided at the application level. Because the entire iris image is not synthesized in the end, data leakage and theft are avoided. Thus, the security of the method for analyzing biometric is improved.

Figure 5:
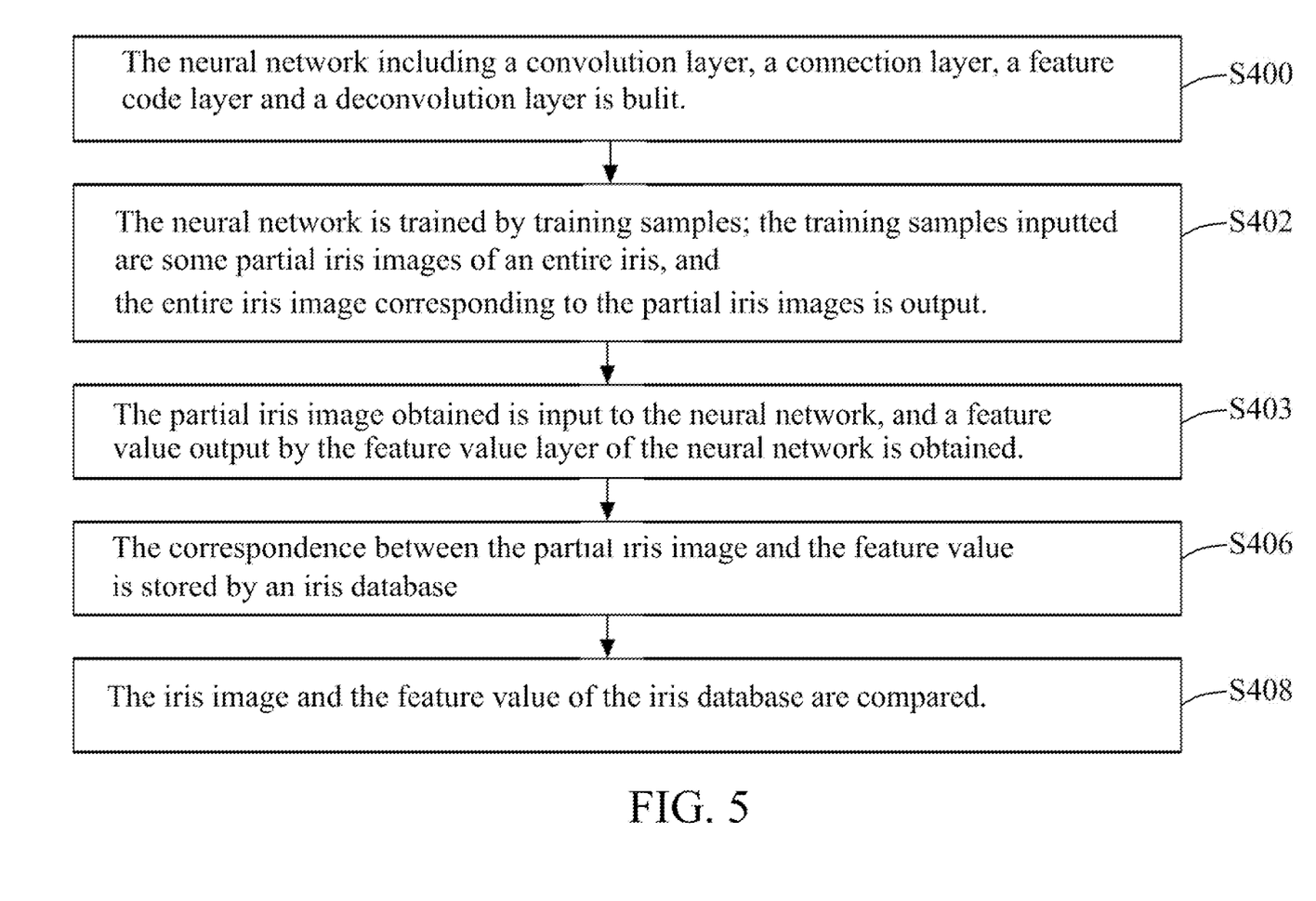
FIG. 5 illustrates a flowchart of a method for analyzing iris of the biometric feature with an embodiment of the present disclosure.

To better satisfy the need of analyzing biometric, by the above analysis method, a correspondence obtained between the partial iris image of the biometric texture and the feature value is stored in a database. In step S406, the correspondence between the partial iris image and the feature value is stored by an iris database. For example, in an embodiment, partial iris images e1, e2, e3, e4 input in the same batch belong to the same iris E1. The partial iris images e1, e2, e3, e4 is input to the trained neural network to obtain an output g1 of the feature value layer. A correspondence 【E1, g1】 between the corresponding entire iris image and the feature value can be stored in the database. A correspondence 【e1, e2, e3, e4, g1】 between the partial iris image and the feature value can be stored. Only valid feature value h1 can even be stored in the database. The iris database is constructed by a plurality of the feature values g1, g2, g3 . . . g100 of the iris. When the comparison is needed, the steps can be performed. A first iris and a second iris are compared. By the above method, the output of the feature value layer is obtained by the neural network obtained by training. The iris image and the feature value of the iris database are compared in step S408. When the difference between the feature value obtained via some partial iris images for comparing processed by the neural network and existing feature values in the database is less than a preset threshold, the iris for comparing is the same to the iris in the database. The calculation method of the difference can refer to the calculation method of the vector difference. The preset threshold can be adjusted according to the actual situation and the optimal preset threshold is 1. The iris database is built by the above method to store the feature value of existing iris. The new iris image is compared with the iris image in the iris database during subsequent verifying iris. It can realize the comparison operation between different fingerprints and further enhance the efficiency of identifying iris.

In some embodiments, after obtaining the partial texture image, when the difference between the feature value output by the neural network and the feature value stored in the biometric texture database is within a preset error range, the feature value output by the neural network and the feature value stored in the biometric texture database is determined to be similar. In some embodiments, the method includes the following step. After obtaining the partial texture image, when the feature value output by the neural network and the feature value stored in the biometric texture database is determined to be similar, a certification directive is executed and passed. The preset error range can be set as needed. If the difference between the two feature values is smaller, the two texture images are similar, and the greater the chance that the certification will pass.

In some other preferred embodiments, a storage media for analyzing biometric is introduced. A computer program is stored by the storage media. When the computer program is executed, the computer program performs the following step of building the neural network. The neural network includes a convolution layer, a connection layer, a feature value layer and a deconvolution layer.

The neural network is trained by training samples. The training samples inputted are some partial texture images of an entire biometric texture, and an entire texture image corresponding to the partial texture images is output. After the training of the neural network is completed, the partial texture image obtained is input to the neural network and a feature value output by the feature value layer of the neural network is obtained.

In some embodiments, when the computer program is executed, the computer program further performs the following step of storing a feature value corresponding to a biometric texture to the biometric texture database.

In some embodiments, when the computer program is executed, the computer program further performs the following step of comparing the predictive value output by the neural network and the feature value in the biometric texture database. In some embodiments, the size of the core of the convolution layer is 5×5. The step size of the core is 2. The number of the feature map is 64.

In some embodiments, the number of neurons in the first layer of the connection layer is 1600. The number of neurons in the second layer of the connection layer is 6400. The feature value layer includes 128 neurons.

In other embodiments, the neural network for analyzing biometric is provided. The neural network includes a convolution layer, a connection layer and a feature value layer that are connected in order. A relationship of the connection weight of a neuron among the convolution layer, the connection layer and the feature value layer are formed by the following step of building the neural network.

The neural network includes a convolution layer, a connection layer, a feature value layer and a deconvolution layer.

The neural network is trained by training samples.

The training samples inputted are some partial texture images of an entire biometric texture, and the entire texture image is output until the training of the neural network was completed.

Although the above embodiments have been described, those skilled in the art can make other changes and modifications to these embodiments once they have learned the basic inventive concept. Therefore, the above descriptions are only the embodiments of the present disclosure, and thus it does not limit the patent protective scope of the present disclosure.

Similarly, any equivalent structure or equivalent process transformation made by using the present specification and the drawings, or directly or indirectly applied to other relevant technical fields, shall be included in the patent protective scope of the present disclosure.

What is claimed is:

1. A method for rebuilding biometric feature comprising:
inputting a partial texture image obtained to a neural network, obtaining a predicted entire texture image that is output by the neural network, wherein the predicted entire texture image comprises an area corresponding to the inputted partial texture image and another area predicted and filled by the neural network;
wherein the method further comprises:
building the neural network; and
training the neural network, wherein a plurality of partial texture images are defined as an input portion of the neural network, and an entire texture image is defined as an output portion of the neural network for training, and as soon as training results are stable, the neural network is gained, wherein the plurality of partial texture images and the entire texture image belong to a same biometric feature.

2. The method for rebuilding biometric feature of claim 1 wherein the neural network comprising a feature value layer, the method further comprises:
after the training of the neural network is completed and the neural network is gained, inputting the partial texture image obtained to the neural network, and obtaining a feature value output by the feature value layer of the neural network.

3. The method for rebuilding biometric feature of claim 2 further comprising:
storing a correspondence between the partial texture image and the feature value to a biometric texture database.

4. The method for rebuilding biometric feature of claim 3 further comprising:
   comparing the feature value output by the neural network with the feature value stored in the biometric texture database.

5. The method for rebuilding biometric feature of claim 4 further comprising:
   when a difference between the feature value output by the neural network and the feature value stored in the biometric texture database is within a preset error range, the feature value output by the neural network and the feature value stored in the biometric texture database is determined to be similar.

6. The method for rebuilding biometric feature of claim 5, further comprising:
   when the feature value output by the neural network and the feature value stored in the biometric texture database is determined to be similar, a certification directive is executed and passed.

7. The method for rebuilding biometric feature of claim 1 further comprising:
   building a biometric texture database wherein the biometric texture database is stored with the plurality of partial texture images defined as the input portion and the entire texture image defined as the output portion.

8. The method for rebuilding biometric feature of claim 7 further comprising:
   comparing the predicted entire texture image output by the neural network with the entire texture image stored in the biometric texture database; and
   if the entire texture image output from the neural network is the same as the entire texture image stored in the biometric texture database, both of the entire texture images are matched to each other, otherwise they are not matched to each other.

9. The method for rebuilding biometric feature of claim 1 wherein the neural network comprises a convolution layer, a connection layer and a feature value layer.

10. The method for rebuilding biometric feature of claim 9 wherein a relationship of a connection weight of a neuron among the convolution layer, the connection layer and the feature value layer are formed when the training of the neural network is completed.

11. The method for rebuilding biometric feature of claim 1 wherein the neural network comprises a convolution layer and a deconvolution layer, the convolution layer and deconvolution layer are connected in a predetermined order.

12. The method for rebuilding biometric feature of claim 1 wherein the partial or entire texture image comprises a fingerprint image, a palm print image, a footprint image, a toe print image, a retinal image or an iris image.

13. A non-transitory storage media storing a computer program, wherein when the computer program is executed, the computer program performs the method according to claim 1.

14. A neural network system for rebuilding biometric feature comprising: a processing circuitry configured to:
   output a predicted entire texture image in response to a partial texture image obtained is inputted to the neural network system;
   wherein the predicted entire texture image comprises an area corresponding to the inputted partial texture image and another area predicted and filled by the neural network system
   wherein the neural network is trained via defining a plurality of partial texture images as an input portion of the neural network, and defining an entire texture image as an output portion of the neural network, and as soon as training results are stable, the neural network is gained, wherein the plurality of partial texture images and the entire texture image belong to a same biometric feature.

15. The neural network system according to claim 14, further comprising:
   a convolution layer, a connection layer and a feature value layer;
   wherein a relationship of a connection weight of a neuron among the convolution layer, the connection layer and the feature value layer are formed when the training of the neural network system is completed.

16. The method for rebuilding biometric feature according to claim 1, wherein the predicted entire texture image output from the neural network and the inputted partial fingerprint image can be defined as a new correspondence and the new correspondence is stored in the biometric texture database.

* * * * *